United States Patent

Miller

[11] Patent Number: 5,863,669
[45] Date of Patent: Jan. 26, 1999

[54] BRAZING SHEET

[75] Inventor: William S. Miller, Beverwijk, Netherlands

[73] Assignee: Hoogovens Aluminium Walzprodukte GmbH, Koblenz, Germany

[21] Appl. No.: 574,412

[22] Filed: Dec. 15, 1995

[30] Foreign Application Priority Data

Dec. 19, 1994 [EP] European Pat. Off. .............. 94203685

[51] Int. Cl.$^6$ .............................. B32B 15/20; F28F 21/08
[52] U.S. Cl. ........................................... 428/654; 165/905
[58] Field of Search ............................ 428/654; 165/905, 165/180, 133

[56] References Cited

U.S. PATENT DOCUMENTS

| | | | |
|---|---|---|---|
| 4,560,625 | 12/1985 | Kaifu et al. ............................. | 428/654 |
| 4,649,087 | 3/1987 | Scott et al. ............................. | 428/654 |
| 4,727,001 | 2/1988 | Takemoto ................................ | 428/654 |
| 5,011,547 | 4/1991 | Fujimoto et al. ....................... | 148/24 |
| 5,176,205 | 1/1993 | Anthony ................................ | 428/654 |
| 5,356,725 | 10/1994 | Eichhorn et al. ........................ | 428/654 |
| 5,375,760 | 12/1994 | Doko ..................................... | 148/528 |
| 5,422,191 | 6/1995 | Childree ................................ | 428/654 |

FOREIGN PATENT DOCUMENTS

| | | |
|---|---|---|
| 326337 | 8/1889 | European Pat. Off. . |
| 0241125 | 10/1987 | European Pat. Off. .......... C22F 1/04 |
| 8201014 | 4/1982 | WIPO . |
| WO 94/22633 | 10/1994 | WIPO . |

OTHER PUBLICATIONS

ASTM Designation G 85–94, Standard Practice for Modified Salt Spray (Fog) Testing, pp. 364–369, Apr. 1994.
VTMS 1993, SAE P263, Scholin et al., Corrosion Resistant Aluminum Radiator Materials for Vacuum and Controlled Atmosphere Brazing, pp. 75–82, Jan. 1993.
Patent Abstracts of Japan, vol. 17, No. 52 (C–1022), 2 Feb. 1993 & JP–A–04 263033 (Furukawa Alum Co Ltd) 18 Sep. 1992, Abstract.
Patent Abstracts of Japan, vol. 16, No. 544 (C–1004), 13 Nov. 1992 & JP–A–04 202735 (Furukawa Alum Co Ltd), 23 Jul. 1992, Abstract.
Patent Abstracts of Japan, vol. 14, No. 356 (C–745), 2 Aug. 1990 & JP–A–02 129333 (Mitsubishi Alum Co Ltd), 17 May 1990, Abstract.
Patent Abstracts of Japan, vol. 16, No. 528 (C–1001), 29 Oct. 1992 & JP–A–04 198448 (Sumitomo Light Metal Ind) 17 Jul. 1992, Abstract.

*Primary Examiner*—John J. Zimmerman
*Attorney, Agent, or Firm*—Stevens, Davis, Miller & Mosher, L.L.P.

[57] ABSTRACT

Brazing sheet having a core sheet made of an aluminum alloy core material and on at least one side thereof a brazing layer of an aluminum alloy containing silicon as main alloying element, wherein the aluminum alloy of the core sheet has the composition (in weight %)

Mn 0.7–1.5
Cu 0.2–2.0
Mg 0.1–0.6
Si >0.15
Fe up to 0.8
Ti optional, up to 0.15
Cr optional, up to 0.35
Zr and/or V optional, up to 0.25 in total
balance Al and unavoidable impurities,
with the proviso that (Cu+Mg)>0.7.

This brazing sheet achieves improved post-brazed strength properties by ageing, e.g. 0.2% yield strength of at least 70 MPa, and has at the same time a good post-brazed corrosion resistance as determined in a SWAAT (ASTM G85) corrosion test.

12 Claims, 3 Drawing Sheets

BRAZING SHEET

BACKGROUND OF THE INVENTION

1. Field of the Invention

The invention relates to brazing sheet having a core sheet of an aluminium alloy core material and a brazing layer of an aluminium alloy having silicon as the main alloying element on at least one side of the core sheet. The invention further relates to a method of making such a brazing sheet and to a process for manufacturing an assembly from the brazing sheet, as well as to an assembly thus manufactured.

2. Description of the Prior Art

Brazing sheet of this type is known and is used for automotive radiators, amongst other products. Two brazing methods, known as Nocolok and vacuum brazing, are conventional and need not be described here. Such brazing takes place at a temperature of about 600° C. as determined by the aluminium silicon alloy of the brazing layer.

The brazing sheet disclosed by EP-A-326 337 consists of an AA 3005 type aluminium alloy core material and a brazing layer of an aluminium alloy having silicon as the main alloying element. This brazing sheet has a good corrosion resistance after brazing because a silicon-rich band of precipitates in the core material is formed near to the interface between the brazing layer and the core material by diffusion of silicon out of the brazing layer into the core material during brazing. The conditions for obtaining the silicon-rich band in the core material specified in EP-A-326 337 are limitations of the silicon and iron content in the core material of Si <0.15% and Fe <0.40% and further a manufacturing process of the brazing sheet in which the brazing sheet is not homogenized before hot rolling and is not interannealed after hot rolling. The copper content of the core material is about 0.3% (herein all composition amounts are % by weight).

From WO94/22633 there is known an improvement of the brazing sheet of EP-A-326 337 having improved yield strength whilst the corrosion resistance is maintained. According to this publication the post-brazed yield strength of the brazing sheet of EP-A-326 337 is 55 MPa whilst the brazing sheet of WO94/22633 has a post-brazed yield strength in the range of 54–85 MPa. This is obtained at a copper content of 0.6% whilst the silicon content is kept <0.15% to maintain the corrosion resistance properties.

Today the weight of cars should be reduced to reduce fuel consumption and air pollution. In connection therewith the weight and dimensions of automotive radiators and their cooling fluid content should be reduced by means of thinner brazing sheet having improved strength properties.

There are known aluminium alloys having better strength properties than those discussed above, but the present applicants believe that they do not meet the requirement of corrosion resistance when used as core material for brazing sheet.

Further prior art documents to be discussed in relation to the present invention are as follows.

JP-A-4-263033 specifies a brazing material having an aluminium core of the composition Mn 0.3–1.5
Cu 0.2–0.9
Mg 0.2–0.5
Si 0.2–1.0
Fe 0.1–0.7
Ti 0.1–0.3
optionally Zr 0.05–0.2
optionally Cr 0.05–0.2
balance Al.

On one side this core has a conventional Al—Si brazing or filler layer, and on the other side it has a sacrificial anode layer of Al—Zn—Mg, whose purpose is to reduce corrosion of the core layer when in contact with water. The inclusion of Mg in the sacrificial anode layer is to permit Mg to diffuse into the core during brazing. Mg content in the core is generally at a low level, to prevent its diffusion into the brazing layer. The brazing material is made with an intermediate annealing step between hot rolling and cold rolling.

JP-A-4-202735 describes a similar brazing sheet having a sacrificial anode layer. The core material has the composition Si 0.05–0.8
Fe 0.05–0.6
Cu 0.1–1.0
Mn 0.6–1.6
Mg 0.05–0.5
optionally Cr, Zr, Ti each ≦0.3
balance Al.

The document discusses formation of intermetallic compounds in the core material to improve strength and corrosion resistance. Homogenization and annealing were employed in the production of the sheet, presumably to ensure formation of the intermetallic compounds. It is stated that up to 1.5% Mg may be added to the sacrificial anode layer, to prevent diffusion of Mg from the core into this layer.

JP-A-2-129333 also describes a brazing sheet having a sacrificial anode layer of Al—Zn—Mg on the aluminium alloy core, but optionally the core may instead have a brazing layer on both sides. The core alloy composition is Cu 0.1–0.6
Mg 0.2–0.6
Mn 0.3–1.5
Si 0.3–0.6
optionally Zr, Cr, Ti
balance Al.

In relation to the present invention, it is commented that, in the two examples in which the sacrificial anode layer is absent, (Cu+Mg) in the core is 0.48 and 0.40 respectively. Homogenization and annealing steps are both included in the manufacture of the sheet.

U.S. Pat. No. 4,649,087 describes a core alloy for a brazing material, having the composition Ti 0.11–0.30
Mn 0.3–1.5
Cu 0.4–0.6
Fe ≦0.7
Si ≦0.8
Mg ≦1.5
balance Al.

The concept described is the inclusion of Ti at higher levels, in order to improve corrosion resistance. In the examples, the core alloy was homogenized prior to hot rolling and intermediate annealing was performed between hot and cold rolling.

WO82/01014 describes a core alloy for brazing material in which Ni is present. The composition is Fe 0.1–0.7 (in preferred composition 0.2–0.5)
Mn 1–1.5

Si 0.2–0.5 (in preferred composition 0.2–0.4)
Cu 0.2–0.5 (in preferred composition 0.25–0.5)
Mg ≦0.5
Ni 0.4–1.0
Cr ≦0.5
Zr ≦0.4
Ti 0.01–0.1
V ≦0.4
others total 0.15
balance Al.

In the preferred composition, (Cu+Mg) is 0.4–0.8. In one example (Cu+Mg) is 0.6, in another 0.65. In two others Mg <0.05. The document proposes a high temperature post-brazing treatment at 450°–550° C. The method of manufacture includes homogenization before hot rolling.

EP-A-241125 similarly describes a post-brazing heat treatment. In the examples, the Cu and Si levels in the core material are low.

JP-A-4-198448 is another document disclosing a brazing material having a sacrificial anode layer containing Mg on an aluminium alloy core material. The core material has the composition Mn 0.3–2.0
Cu 0.25–0.8
Si 0.2–1.0
Mg ≦0.5
Ti ≦0.35
balance Al.

The sacrificial anode layer contains Mg 1.2–2.5 and Si 0.2–0.8. It is stated that Mg in the sacrificial anode layer diffuses into the core during brazing.

SUMMARY OF THE INVENTION

The object of the invention is therefore to provide a brazing sheet having an aluminium alloy core and an aluminium alloy brazing layer, providing improved strength properties and at the same time good corrosion resistance.

The present invention is based on the finding that, by careful choice of the core alloy composition, a brazing sheet of high post-brazing strength and high corrosion resistance can be obtained without the need for a sacrificial anode layer. Furthermore, the sheet of the invention undergoes post-brazing ageing to achieve very high strength levels. The method of manufacture of the sheet may also play a critical part.

According to the invention, there is provided brazing sheet having a core sheet made of an aluminium alloy core material and on at least one side thereof a brazing layer of an aluminium alloy containing silicon as main alloying element, wherein the aluminium alloy of the core sheet has the composition (in weight %)

Mn 0.7–1.5
Cu 0.2–2.0
Mg 0.1–0.6
Si >0.15
Fe up to 0.8
Ti optional, up to 0.15
Cr optional, up to 0.35
Zr and/or V optional, up to 0.25 in total
balance Al and unavoidable impurities,
with the proviso that (Cu+Mg)>0.7, and wherein the brazing sheet is capable of obtaining, following brazing and post-brazing ageing, a 0.2% yield strength of at least 70 Mpa. It is a significant feature of the invention that this high yield strength after ageing is combined with a good post-brazing corrosion resistance as determined in a SWAAT (ASTM G85) corrosion test. This corrosion resistance as determined by the SWAAT Test can be at least 24 or 25 days (600 hours).

As mentioned, the post-brazing yield strength of the brazing sheet of the invention is especially high after ageing. At the same time surprisingly the brazing sheet has a good corrosion resistance. This is against all metallurgical expectations and also contrary to the opinion presented in the state of the art (e.g. EP-A-326 337 and WO94/22633) according to which a low silicon content of less than 0.15% is mandatory to obtain corrosion resistance.

Preferably for strength and corrosion resistance (Cu+Mg) >1.0, and particularly preferably >1.2. Thereby not only a good corrosion resistance after Nocolok brazing, and also after vacuum brazing, is obtained. For corrosion resistance it is preferred that Cu≧0.65.

Preferably the silicon content in the core material is ≧0.20, more preferably ≧0.30 and most preferably ≧0.40. A suitable maximum for Si is 1.0.

As indicated, optionally Cr, Zr and/or V are present in the composition of the core material, for example about 0.3% Cr and about 0.1% Zr, in order to obtain an extra improvement of the post-brazing strength properties.

Ti may be present up to 0.15 to act as a grain refining additive, but preferably is less than 0.1 and more preferably less than 0.05.

Fe is usually present in commercial aluminium alloy but should not exceed 0.8, and preferably not exceed 0.4, in the present invention.

Zn also may typically be present as an impurity, in an amount of less than 0.25.

As is known in such alloys, small amounts of other elements may be tolerated. In general such elements are each present at less than 0.05, with a total of less than 0.15.

According to the invention the brazing sheet is capable of providing a 0.2% yield strength of at least 70 MPa after brazing and ageing. Typically brazing is performed at about 600° C., and typical ageing processes for the obtaining of this yield strength are (i) natural ageing for 100 hours or 1000 hours or more and (ii) artificial ageing for at least 10 hours at about 165° C. Ageing is discussed further below.

In the invention, one or both faces of the core sheet have a clad layer. The brazing layer may be present on one or both faces of the core sheet, and may be a suitable Si-containing aluminium alloy brazing layer (filler layer) known in the art. Such layers may contain 5–14% Si. These may be a brazing layer on one face and another clad layer, e.g. a sacrificial anode layer, on the other. Mg may be absent from these clad layers, or if present Mg may be in an amount not sufficient to result in migration of Mg into the core sheet during brazing. Such migration, to strengthen the core sheet, is a feature of some of the prior art discussed above, but is not required in the present invention since the core sheet already has sufficient strength.

In the manufacture of the brazing sheet of the invention preferably the alloy of the core sheet is a cast material which does not undergo homogenization after its casting prior to a hot rolling which is performed after application of the brazing layer or layers. Preferably the sheet is not subjected to an intermediate annealing step between a hot rolling and a cold rolling, following the application of the brazing layer or layers to the core sheet.

According to the invention, there is provided a method of making the brazing sheet of the invention described above, comprising the steps of (i) casting the aluminium alloy core material (ii) applying the brazing layer or layers to a sheet of the aluminium alloy core material (iii) hot rolling the aluminium alloy core material sheet and brazing layer or layers (iv) cold rolling the hot rolled product from step (iii)

wherein between steps (i) and (ii) the aluminium alloy core material is not subjected to a homogenization treatment and between steps (iii) and (iv) the product is not subjected to an annealing treatment.

In another aspect the invention provides a process for manufacturing an assembly from brazing sheet, comprising the steps of (i) forming parts of which at least one is made from the brazing sheet, (ii) assembling the parts into the assembly, and (iii) brazing the assembly, wherein (iv) the part or parts made from brazing sheet are at least partly made from brazing sheet in accordance with this invention described above, and (v) the assembly is subjected to ageing after the brazing of step (iii).

The ageing may be natural ageing (at ambient temperature) and/or artificial ageing at an elevated temperature, preferably in the range of 100°–250° C.

Natural ageing can result in a post-brazed 0.2% yield strength of more than 85 MPa, e.g. at the level of 100 Mpa. A natural ageing period of 3 months is typical for this.

Artificial ageing can result in a post-brazed 0.2% yield strength of more than 100 MPa, e.g. at the level of 200 MPa.

From the viewpoint of the manufacturers of such assembly and the furnaces available to them, preferably the artificial ageing is executed for a time period in the range of 1–100 hours. It is recommended to delay for at least four days after brazing, before the artificial ageing.

For example, the artificial ageing is executed at about 165° C. for a time period in the range of 10–100 hours or at an equivalent combination of time and temperature giving a similar ageing effect.

This process results in high post-brazing strength properties. Particularly, the invention can provide brazing sheet which is capable of obtaining, after brazing at 600° C. and post-brazing ageing at 165° C. during a time in the range 10 to 100 hours, a 0.2% yield strength which is at least twice its 0.2% yield strength immediately after brazing at 600° C.

In order for natural and artificial ageing to occur, it appears to be desirable that those elements (Mg,Si, Cu) that cause this to occur must be present in solid solution after the completion of the brazing process. If, after brazing, the product is cooled very slowly, then these elements will precipitate in coarse particles and there will be no natural or artificial ageing. The faster the cooling rate the more of these elements will be retained in solution and hence the higher will be the response of the material to natural and artificial ageing.

Preferably therefore the brazing sheet is cooled in air from the brazing temperature or is cooled more rapidly than by natural air cooling. However, water quenching is not practical for brazed components.

In yet a further aspect the invention is embodied in an assembly manufactured in accordance with the invention in which the parts made from the brazing sheet in accordance with the invention have a 0.2% yield strength of more than 85 MPa and preferably of at least 100 MPa.

BRIEF INTRODUCTION OF THE DRAWINGS

Embodiments of the invention will now be described by way of non-limitative example with reference to the accompanying drawings in which.

DESCRIPTION OF THE PREFERRED EMBODIMENTS

Example 1

A number of test alloys for core sheet material were made with compositions in weight % as shown in Table 1.

TABLE 1

| Alloy | Mn | Cu | Mg | Si |
|---|---|---|---|---|
| C1 | 1.1 | 0.3 | 0.25 | 0.1 |
| C2 | 1.1 | 0.3 | 0.25 | 0.5 |
| C3 | 1.1 | 0.3 | 0.5 | 0.1 |
| C4 | 1.1 | 0.3 | 0.5 | 0.5 |
| C5 | 1.1 | 0.75 | 0.25 | 0.1 |
| C6 | 1.1 | 0.75 | 0.25 | 0.5 |
| C7 | 1.1 | 0.75 | 0.5 | 0.1 |
| C8 | 1.1 | 0.75 | 0.5 | 0.5 |

Balance Al, Fe at normal impurity level (less than 0.8) and unavoidable impurities In this table the alloys C1 and C3 are within the composition known from EP-A-326 337 and the alloys C5 and C7 of this type are known from WO94/22633.

The test alloys were not homogenized after casting and are clad on one side with an AA 4045 type aluminium alloy with 9.0–11.0 silicon as the main alloying element, hot rolled and cold rolled to a thickness of 0.39 mm without intermediate annealing. Thereafter the brazing sheet was subjected to Nocolok and vacuum brazing in a conventional manner. After brazing, the samples were cooled in air of ambient temperature.

Figure 1:
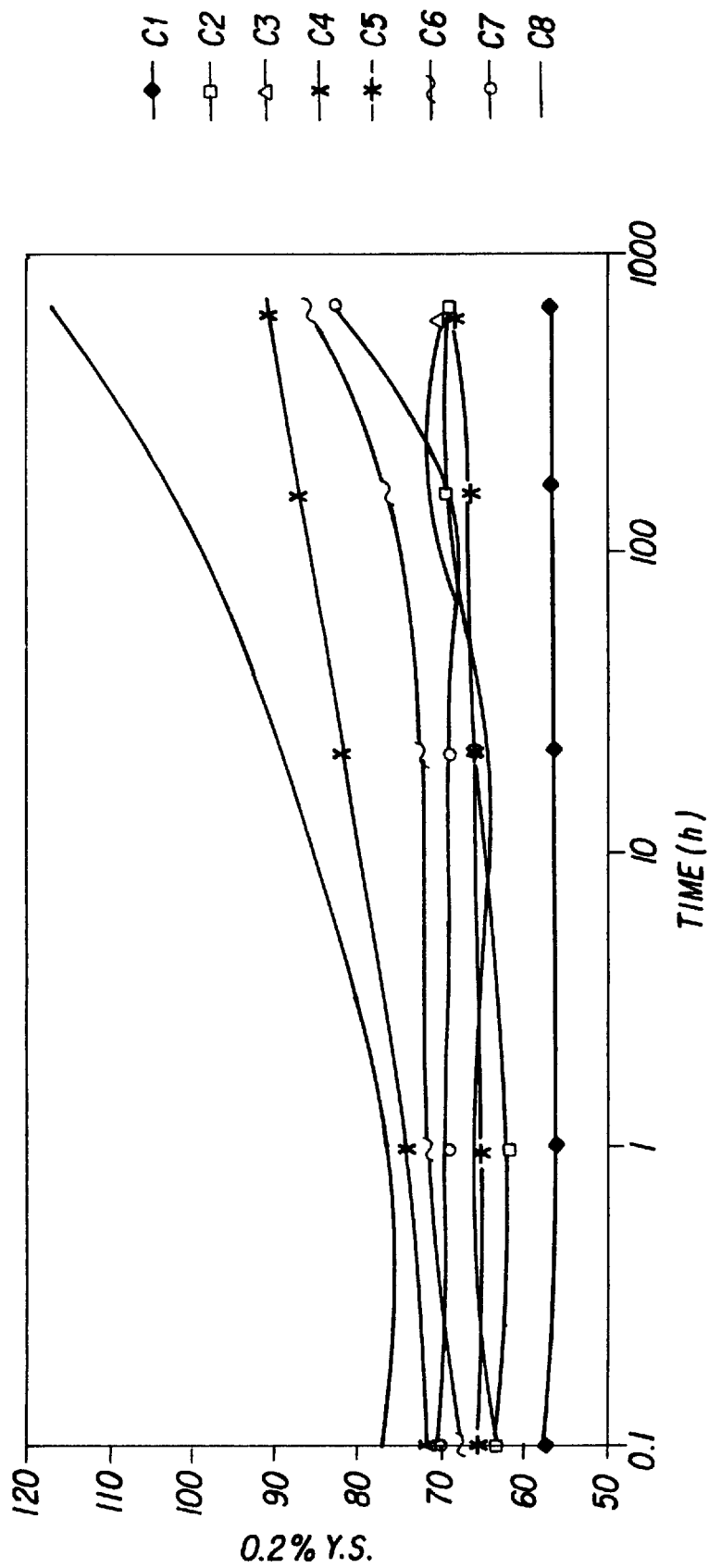
FIG. 1 is a graph of 0.2% yield strength (in MPa) plotted against ageing time (hours) for a post-brazing natural ageing process of eight brazing sheets.

FIG. 1 shows post-brazed 0.2% yield strengths of these brazing sheets in natural ageing. The alloys C1 and C3 falling within the scope of EP-A-326 337 have yield strengths in the range of 55–65 MPa. The value of 55 MPa mentioned in WO94/22633 is confirmed by alloy C1. The alloys C5 and C7 falling within the scope of WO94/22633 have yield strengths in the range of 65–85 MPa. This confirms the values mentioned in WO94/22633. The alloys C4, C6 and C8 have yield strengths above 85 MPa after natural ageing, the yield strength of C8 running up to about 115 MPa.

Figure 2:
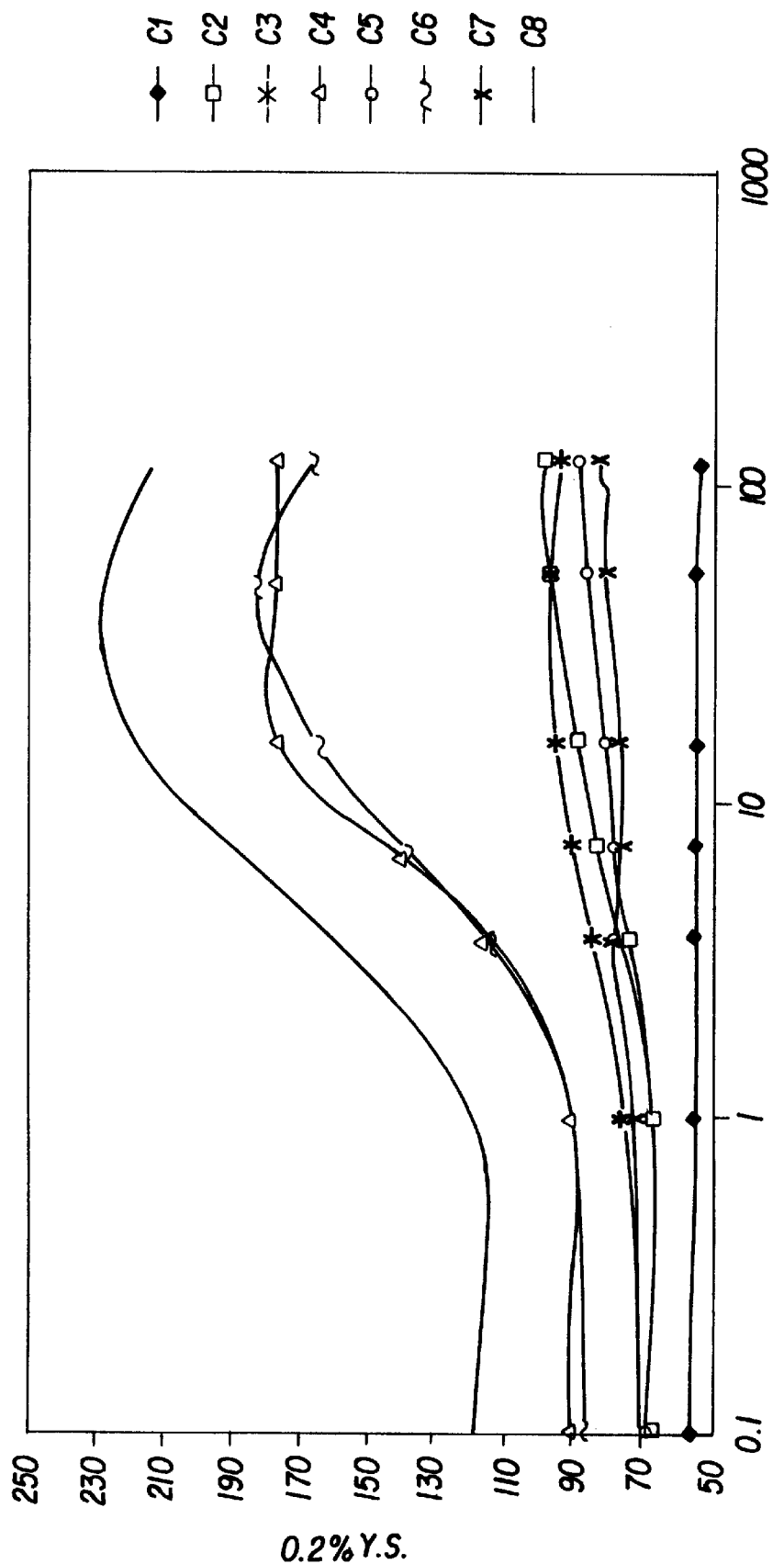
FIG. 2 is a similar graph for an artificial brazing process performed after the natural ageing of the same eight alloys.

FIG. 2 shows post-brazed 0.2% yield strengths in artificial ageing at a temperature of 165° C. The artificial ageing was in this case applied on test pieces which had been naturally aged for 3 months (but the duration of natural ageing prior to artificial ageing does not significantly change the properties obtained by the artificial ageing). The alloys C1, C3, C5, C7 and C2 show no or almost no ageing effects. The alloys C4, C6 and C8 show substantial ageing effects. For artificial ageing at 165° C. 0.2% yield strengths above 100 MPa are obtained. C8 shows a maximum of about 230 MPa for brazing sheet having been artificial aged during a time in the range of 10–100 hours. At higher ageing temperature the time will be shorter. Manufacturers may wish to apply a time in the order of magnitude of one day or a part thereof.

ageing and (3) after artificial ageing at 165° C. The table gives 0.2% yield strength (YS), ultimate tensile strength (UTS) and elongation at break (E).

TABLE 3

| | Post Braze properties | | | Natural Ageing properties* | | | Artificial Ageing properties** | | |
|---|---|---|---|---|---|---|---|---|---|
| Alloy | 0.2% YS (MPa) | UTS (MPa) | E [%] | 0.2% YS (MPa) | UTS [MPa] | E [%] | 0.2% YS (MPa) | UTS [MPa] | E [%] |
| C1 | 58 | 147 | 15.1 | 62 | 152 | 14 | 56 | 147 | 14.4 |
| C2 | 63 | 163 | 11.6 | 66 | 165 | 12.1 | 102 | 178 | 7 |
| C3 | 64 | 165 | 15.2 | 70 | 168 | 12.7 | 100 | 186 | 9.7 |
| C4 | 72 | 181 | 13.3 | 93 | 204 | 12.7 | 183 | 240 | 2.8 |
| C5 | 65 | 176 | 14.1 | 70 | 176 | 11.1 | 92 | 186 | 9.3 |
| C6 | 68 | 184 | 15.1 | 92 | 219 | 14.3 | 191 | 248 | 4.3 |
| C7 | 70 | 186 | 15.4 | 102 | 225 | 16.7 | (160)*** | — | — |
| C8 | 77 | 201 | 12.2 | 118 | 247 | 11.6 | 233 | 274 | 3.6 |

*Properties after three months of natural ageing.
**Properties at peak strength obtained in artificial ageing at 165° C. (the time to obtain peak strength different for each alloy).
***Value obtained at 180° C. for 120 hours, not peak strength (no artificial ageing strength increase occurred at 165° C. for 120 hours).

The results in FIGS. 1 and 2 apply for both Nocolok and vacuum brazing.

The brazing sheets were subjected to a SWAAT (ASTM G85) corrosion test in the Nocolok and the vacuum brazed condition. Target-life is 600 hours (25 days). Results are shown in Table 2.

TABLE 2

| Alloy | Average SWAAT life | |
|---|---|---|
| Braze system | Nocolok | Vacuum |
| Units | Days | Days |
| C1 | NR* | NR* |
| C2 | 3.3 | 7 |
| C3 | NR* | >25** |
| C4 | >24** | 4 |
| C5 | >24** | >25** |
| C6 | >24** | 7 |
| C7 | NR* | NR* |
| C8 | >24** | >25** |

*NR = No results available
** = SWAAT test discontinued after days shown

Alloys C3 and C5 show acceptable results as expected. Alloy C2 shows results that are not acceptable as could be expected from prior art disclosures in view of its high silicon content in the base material. Most surprisingly however alloys C4, C6 and C8 have a result of at least 24 days in the Nocolok brazed condition, and alloy C8, in which both Cu and Mg are high, at least 25 days in the vacuum brazed condition. It is believed that the alloys C4 and C6 have less good corrosion resistance after vacuum brazing, due to lower Cu or lower Mg. Mg tends to evaporate in vacuum brazing.

Example 2

A test alloy was made having the composition of alloy C8 but with 0.3% Cr and 0.1% Zr added to the composition. This alloy was tested in the same way as in Example 1. The alloy had a good corrosion resistance. The 0.2% yield strength was about 15 MPa higher than that of alloy C8.

Figure 3:
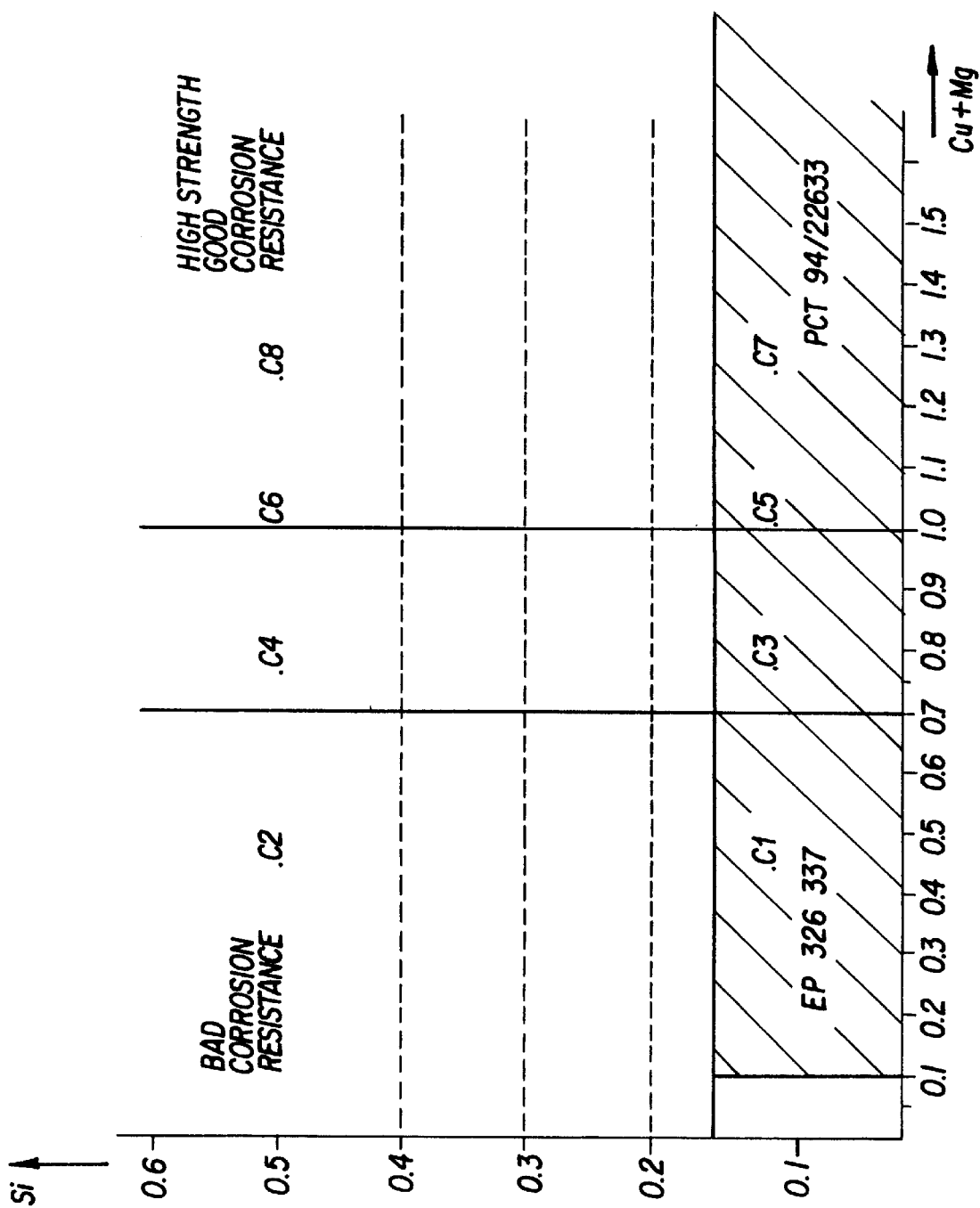
FIG. 3 is a graphical representation of the invention plotting Si content (in weight %) against (Cu+Mg) content (in weight %) of the core sheet alloy.

Table 3 below gives values of the mechanical properties of the brazing sheets with the alloys C1–C8, in the three states (1) post-brazing without ageing, (2) after natural In FIG. 3 by "good corrosion resistance" there is indicated the area in which core material used in accordance with the invention has a good post-brazed SWAAT corrosion resistance of for example about 25 days. Further the area of EP-A-326 337 including alloys C1 and C3 and the area of WO94/22633 including C5 and C7 is indicated. The alloy C2 is outside the area of "good corrosion resistance".

The present applicants have as yet no metallurgical explanation for the effect discovered. It is as yet uncertain whether a silicon-rich band of precipitates is formed in the core material, but it appears to be desirable to leave out homogenization during manufacturing.

I claim:

1. Brazing sheet consisting of a core sheet made of an aluminum alloy core material and on at least one side thereof a brazing layer of an aluminum alloy containing silicon as main alloying element, wherein the aluminum alloy of the core sheet has the composition (in weight %):

Mn 0.7–1.5
Cu 0.2–2.0
Mg 0.1–0.6
Si not less than 0.20
Fe up to 0.8
Ti <0.1
Cr optional, up to 0.35
Zr and/or Va optional, up to 0.25 in total
balance Al and unavoidable impurities, with the proviso that (Cu+Mg)>1.0,
wherein said aluminum alloy of said core sheet is a cast material which has not been subjected to a homogenization treatment after its casting prior to a hot rolling performed after the application to it of said brazing layer or layers, and
wherein the brazing sheet is capable of obtaining, following brazing and post-brazing ageing, a 0.2% yield strength of at least 70 MPa, said brazing sheet having a post-brazing corrosion resistance for 600 hours as determined in a SWAAT (ASTMG85) corrosion test.

2. Brazing sheet according to claim 1 wherein the amount of Ti in said composition of the aluminium alloy of the core sheet is less than 0.05.

3. Brazing sheet according to claim 1 wherein the amount of Fe in said composition of the aluminium alloy of the core sheet is not more than 0.4.

4. Brazing sheet according to claim 1 wherein the amount of Cu in said composition of the aluminium alloy of the core sheet is not less than 0.65.

5. Brazing sheet according to claim 1 wherein in said composition of the aluminium alloy of the core sheet (Cu+Mg)>1.2.

6. Brazing sheet according to claim 1 wherein the amount of Si in said composition of the aluminium alloy of the core sheet is not less than 0.30.

7. Brazing sheet according to claim 6 wherein the amount of Si in said composition of the aluminium alloy of the core sheet is not less than 0.40.

8. Brazing sheet according to claim 1 wherein said brazing material has been subjected to hot rolling and then cold rolling, after the application of said brazing layer or layers to said core sheet, without intermediate annealing between said hot and cold rolling.

9. Brazing sheet according to claim 1 which is capable of obtaining, after brazing at 600° C. and post-brazing ageing at 165° C. during a time in the range 10 to 100 hours, a 0.2% yield strength which is at least twice its 0.2% yield strength immediately after brazing.

10. An assembly comprising of a brazing sheet consisting of a core sheet made of an aluminum alloy core material and on at least one side thereof a brazing layer of an aluminum alloy containing silicon as a main alloying element, wherein the aluminum alloy of the core sheet consists essentially of in weight %:

Mn 0.7–1.5

Cu 0.2–2.0

Mg 0.1–0.6

Si not less than 0.20

Fe up to 0.8

Ti <0.1

Cr optional, up to 0.35

Zr and/or Va optional, up to 0.25 in total, the balance Al and unavoidable impurities, with the proviso that (Cu+Mg)>1.0, wherein said aluminum alloy of said core sheet is a cast material which has not been subjected to a homogenization treatment after its casing prior to a hot rolling performed after the application to it of said brazing layer or layers, and said brazing sheet having a post-brazing corrosion resistance for 600 hours as determined in a SWAAT (ASTMG85) corrosion test, said assembly manufactured by the steps of:

I forming parts of which at least one is made from the brazing sheet;

ii assembling the parts into the assembly;

iii brazing the assembly; and iv subjecting the assembly to aging after the brazing steps, and parts of the assembly made from said brazing sheet have 0.2% yield strength of more than 85 MPa after said aging.

11. Assembly in accordance with claim 10, wherein the parts made from said brazing sheet have a 0.2% yield strength of at least 100 MPa after said ageing.

12. Assembly in accordance with claim 10 wherein the parts made from said brazing sheet have a corrosion resistance as determined by a SWAAT (ASTM G85) corrosion test of at least 600 hours.

* * * * *